(12) United States Patent
Goldberg et al.

(10) Patent No.: US 6,659,392 B2
(45) Date of Patent: Dec. 9, 2003

(54) VISUAL INDICATION OF UNINSTALLED CONTROL PANEL FUNCTIONS

(75) Inventors: Mark L. Goldberg, Peoria, AZ (US); Ken L. Snodgrass, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/251,431

(22) Filed: Sep. 19, 2002

(65) Prior Publication Data

US 2003/0052220 A1 Mar. 20, 2003

Related U.S. Application Data

(60) Provisional application No. 60/324,035, filed on Sep. 20, 2001.

(51) Int. Cl.$^7$ .............................................. B64D 43/00
(52) U.S. Cl. ................................................ 244/1 R
(58) Field of Search ........................... 244/137.4, 1 R, 244/129.1; 116/209, 52, 28 R, 124 R; 340/568.1, 652, 653, 426; 200/56 R, 51.1; 307/10.1, 127, 98–99, 9.1; 89/1.55; 361/391, 422, 679–723

(56) References Cited

U.S. PATENT DOCUMENTS

| 3,201,774 A | * | 8/1965 | Uemura |
| 3,665,303 A | * | 5/1972 | Richards et al. .......... 340/568.1 |
| 4,283,720 A | * | 8/1981 | Herledan .................... 340/653 |
| 4,549,170 A | * | 10/1985 | Serres et al. ................ 340/568 |
| 4,687,888 A | * | 8/1987 | Hasircoglu ................. 200/51.1 |
| 5,359,230 A | * | 10/1994 | Namiki et al. ............. 307/10.1 |
| 5,397,924 A | * | 3/1995 | Gee et al. .................... 307/9.1 |

FOREIGN PATENT DOCUMENTS

| EP | 0129894 A | 1/1985 |
| EP | 1109183 A | 6/2001 |

* cited by examiner

*Primary Examiner*—Galen L. Barefoot

(57) ABSTRACT

A standardized control panel for aircraft provides manually operable controls that are configured to activate an aircraft function if the requested aircraft function is installed on the aircraft or, are otherwise configured to activate a visual indicator if the requested aircraft function is absent from the aircraft.

19 Claims, 1 Drawing Sheet

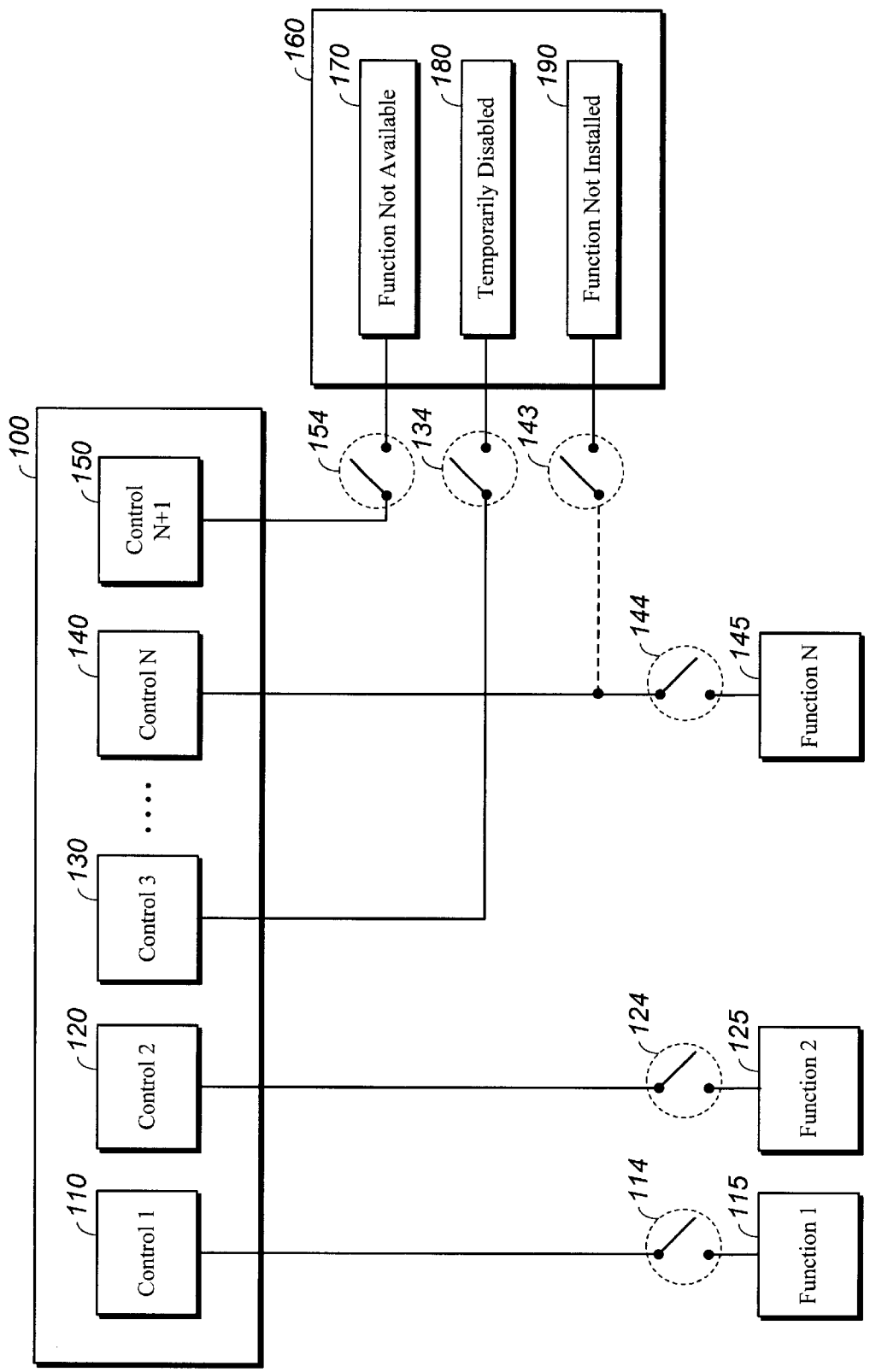

VISUAL INDICATION OF UNINSTALLED CONTROL PANEL FUNCTIONS

CROSS REFERENCE TO RELATED APPLICATIONS

This application claims the benefit of U.S. Provisional Patent Application No. 60/324,035, filed Sep. 20, 2001.

BACKGROUND OF THE INVENTION

1. Technical Field

The present invention relates generally to the field of aviation and more particularly to control panels for controlling an aircraft.

2. Background Art

With many present day aircraft, and particularly military aircraft, many aircraft functions are accessed or activated by manipulating some type of control (i.e., a switch, knob, button or the like). Depending on the specific function of the manipulated control, the crewmember will activate a specific aircraft function or receive some type of feedback related to the operational performance of the aircraft. In general, most of these aircraft operational and status controls are available to the crewmembers via various control panels situated in appropriate locations throughout the aircraft. The feedback received from these various controls is usually considered to be an integral part of controlling most aircraft. Since different aircraft have different operational capabilities and different flight characteristics, the number and type of controls found in each different type of aircraft may vary somewhat.

While various types of aircraft may have the same general operational characteristics, the specific functions of a given aircraft may require a number of controls not found on other aircraft. This means that an aircraft manufacturer usually designs an aircraft-specific set of controls for each different model or type of aircraft that they manufacture. While the goal of achieving certain manufacturing efficiencies may indicate the practicality of a single control panel for each particular type of aircraft, there are other considerations that come into play. For example, some of the various government agencies that approve and certify aircraft require that each and every control on a control panel provide some indication to the crewmember if a given control is non-functional or does not activate an aircraft function or feature. In general, some indication should be given to alert the crewmember that the control is non-functional. Additionally, many similar aircraft have very different functions, depending on the specific application and the needs of the customer ordering the aircraft. For example, military and commercial versions of similar aircraft require significantly different features and functions, even though the operational flight characteristics of the two aircraft may be substantially similar.

Therefore, while providing a single control panel adaptable to many different types of aircraft may be desirable, practical considerations currently limit the standardization of the controls for a given control panel. Accordingly, aircraft manufacturers routinely customize the control panel for each different set of features available to the crew for each specific type of aircraft. Not only is this less than optimal from the perspective of manufacturing efficiency, it can significantly increase the number of design requirements for a given type of aircraft, even when only minor differences exist between various models. Since each new type of aircraft must undergo testing and review prior to being certified for use, customization of the control panel can introduce delays into the approval process for aircraft when the control panels are modified.

In view of the foregoing, it should be appreciated that it would be desirable to provide methods and apparatus for standardizing aircraft control panel configurations without a separate and distinct control panels for each aircraft. It would also be desirable to maintain compliance with various government standards regarding control panel functionality without comprising design and/or manufacturing decisions. Furthermore, additional desirable features will become apparent to one skilled in the art from the foregoing background of the invention and following detailed description of a preferred exemplary embodiment and appended claims.

SUMMARY OF THE INVENTION

A standardized control panel for aircraft provides manually operable controls that are configured to activate an aircraft function if the requested aircraft function is installed on the aircraft or, are otherwise configured to activate a visual indicator if the requested aircraft function is absent from the aircraft.

BRIEF DESCRIPTION OF THE DRAWINGS

The preferred exemplary embodiment of the present invention will hereinafter be described in conjunction with the appended drawings, where like designations denote like elements, and the Figure is a schematic block diagram of a control panel according to a preferred exemplary embodiment of the present invention.

DETAILED DESCRIPTION OF A PREFERRED EMBODIMENT

The most preferred embodiments of the present invention provide a control panel that performs some function for each of the controls found on the control panel, even the controls for those functions that are disabled or are not included in the aircraft system under control.

Referring now to the Figure, a control panel 100 in accordance with a preferred exemplary embodiment of the present invention is illustrated. Control panel 100 houses a plurality of manually operable controls 110, 120, 130, 140, and 150. Each of controls 110–150 may be implemented as any type of aircraft control known to those skilled in the art (e.g., knobs, buttons, switches, etc.). Additionally, although the total number of manually operable controls illustrated in the Figure is shown to be five, those skilled in the art will understand that the various preferred embodiments of the present invention may be easily expanded to include any suitable number of controls and, if necessary, incorporate additional control panels as well.

Each of controls 110–150, found on control panel 100, are coupled to one of switches 114, 124, 134, 143, 144, and 154. Controls 110, 120, and 140 are operational controls that are configured to activate aircraft functions 115, 125, and 145, respectively. Aircraft functions 115, 125, and 145 may be considered requestable mechanisms, any of which may be activated by a crewmember. For purposes of this explanation, functions or requestable mechanisms may be any type of activity normally associated with controlling or operating an aircraft known to those skilled in the art.

In this particular embodiment, controls 130 and 150 are inactive or non-operational controls and are configured to provide a visual indicator, such as display messages 170 and 180 of display panel 160, to indicate the lack of the requested aircraft function. It should be noted that although controls 130 and 150 are not connected to any aircraft function for this particular application, in another control panel application, controls 130 and 150 may be configured to activate an aircraft function. Accordingly, controls 130 and 150 may also be configured to activate some requestable mechanism in certain applications.

As shown in the Figure, some of controls 110–150 will activate various aircraft functions and some of controls 110–150 were provided for functions which have either been disabled, not installed, or have otherwise been made unavailable in the operating environment for this specific aircraft. For example, control 110, when actuated, will energize switch 114, activating function 115. Similarly, control 120 will energize switch 124, thereby activating function 125 and, in like fashion, control 150 will energize switch 144, thereby activating control 145. However, in this example, control 130 and control 150 are designated for requestable mechanisms or functions that are not available in this specific aircraft. Accordingly, whenever an operator actuates control 130, switch 134 is energized and a visual indication, such as message 180 displayed on display panel 160, will indicate that the function typically actuated by control 130 is temporarily disabled.

Similarly, whenever control 150 is actuated, a visual indication, such as message 170 displayed on display panel 160, will indicate that the requested function is not available. As shown in the Figure, control 140 is connected to switch 144 and will, in the current configuration, activate function 145. However, in a different aircraft with the same control panel 100, function 145 may not be installed. In that aircraft, control 140 will be connected to switch 143. Then, when control 140 is actuated, switch 143 will be energized, displaying message 190 to indicate that the requested function is not installed.

Those skilled in the art will understand that the number of messages displayed by display panel 160 and nature of the content for messages 170, 180, and 190 will be determined by the specific needs and design requirements for a given application. It should also be noted that other types of visual indicators such as flashing lights, various graphics, etc. may be employed instead of or in addition to messages 170, 180, and 190 on display panel 160. Finally, although control panel 100 and display panel 160 are shown as separate elements for purposes of clarity, in many applications control panel 100 and display panel 160 will be combined into a single panel.

From the foregoing description, it should be appreciated that methods and apparatus are provided for a standardized control panel. While certain preferred exemplary embodiments have been presented in the foregoing detailed description of the preferred exemplary embodiments, it should be appreciated that a vast number of variations in the embodiments exist. It should also be appreciated that the preferred exemplary embodiments are only examples, and are not intended to limit the scope, applicability, or configuration of the invention in any way. Rather, the foregoing detailed description provides those skilled in the art with a convenient road map for implementing the preferred exemplary embodiments of the invention. It should also be understood that various changes may be made in the function and arrangement of elements described in the preferred exemplary embodiments without departing from the spirit and scope of the invention as set forth in the appended claims.

What is claimed is:

1. An apparatus for indicating when a requestable mechanism is absent in an aircraft, said apparatus comprising:
   an aircraft control panel;
   at least one manually operable control housed in said aircraft control panel;
   a first switch coupled to said control panel, said first switch being configured to activate said requestable mechanism; and
   a second switch coupled to said control panel, said second switch being configured to activate a visual indicator, wherein said at least one manually operable control is coupled to said first switch when said requestable mechanism is present in said aircraft and wherein said at least one manually operable control is coupled to said second switch when said requestable mechanism is absent from said aircraft.

2. The apparatus of claim 1 further comprising a display panel coupled to said control panel via said second switch, said display panel being configured to display said visual indicator.

3. The apparatus of claim 1 wherein said at least one manually operable control comprises a switch.

4. The apparatus of claim 1 wherein said at least one manually operable control comprises a knob.

5. The apparatus of claim 1 wherein said at least one manually operable control comprises a button.

6. The apparatus of claim 1 wherein said visual indicator comprises an illuminated message on a display panel.

7. The apparatus of claim 1 wherein said visual indicator comprises a flashing light on a display panel.

8. An aircraft apparatus comprising:
   an aircraft control panel;
   a plurality of manually operable controls housed in said aircraft control panel;
   a plurality of switches coupled to said control panel, wherein a first switch of said plurality of switches is configured to activate at least one requestable mechanism, and wherein a second switch of said plurality of switches is configured to activate at least one visual indicator, wherein at least one of said plurality of manually operable controls is coupled to said first switch when said requestable mechanism is present in said aircraft and wherein said at least one of said plurality of manually operable controls is coupled to said second switch of said plurality of switches when said requestable mechanism is absent from said aircraft; and
   a display panel coupled to said control panel via said second switch of said plurality of switches, said display panel being configured to display said at least one visual indicator.

9. The apparatus of claim 8 wherein said at least one manually operable control comprises a switch.

10. The apparatus of claim 8 wherein said at least one manually operable control comprises a knob.

11. The apparatus of claim 8 wherein said at least one manually operable control comprises a button.

12. The apparatus of claim 8 wherein said at least one visual indicator comprises a flashing light displayed on said display panel.

13. The apparatus of claim 8 wherein said at least one visual indicator comprises an illuminated message on a display panel.

14. A method of indicating when a requestable mechanism in an aircraft is not present in an aircraft comprising the steps of:

actuating a manually operable control on a control panel;

activating said requestable mechanism if said requestable mechanism is installed in said aircraft; and activating a visual indicator to indicate the absence of said requestable mechanism if said requestable mechanism is not installed in said aircraft.

15. The method of claim 14 wherein said manually operable control comprises a switch.

16. The method of claim 14 wherein said manually operable control comprises a knob.

17. The method of claim 14 wherein said manually operable control comprises a button.

18. The method of claim 14 wherein said visual indicator comprises an illuminated message on a display panel.

19. The method of claim 14 wherein said visual indicator comprises a flashing light on a display panel.

* * * * *